United States Patent

Miyake et al.

[11] Patent Number: 5,774,428
[45] Date of Patent: Jun. 30, 1998

[54] METHOD AND APPARATUS FOR MAGNETO-OPTICAL RECORDING OR REPRODUCING USING MODULATED MAGNETIC FIELD

[75] Inventors: Tomoyuki Miyake, Nara; Nobuo Ogata, Shiki-gun; Kunio Kojima, Nabari, all of Japan

[73] Assignee: Sharp Kabushiki Kaisha, Osaka, Japan

[21] Appl. No.: 671,898

[22] Filed: Jun. 27, 1996

[30] Foreign Application Priority Data

Jul. 11, 1995 [JP] Japan ................................. 7-175208

[51] Int. Cl.[6] ...................................................... G11B 11/00
[52] U.S. Cl. .................................. 369/13; 369/49; 369/91
[58] Field of Search ................................ 369/13, 14, 116, 369/110, 275.3, 275.2, 49, 91; 360/114, 59

[56] References Cited

U.S. PATENT DOCUMENTS 5,377,178  12/1994  Saito et al. ........................ 369/275.3
5,602,823   2/1997  Aoki et al. ........................ 369/275.3

*Primary Examiner*—Tan Dinh
*Attorney, Agent, or Firm*—David G. Conlin; George W. Neuner

[57] ABSTRACT

First, a recording magnetic field is generated by a magnetic head using a coil drive current $a_1$, and a first data signal is recorded on a groove of a recording layer of a magneto-optical disk. Thereafter, similarly, a second data signal is recorded on the same groove as above by a coil drive current $a_2$. In this case, the first and second data signals have different signal frequencies which do not overlap each other. The amplitude $A_1$ of the coil drive current $a_1$, is set greater than the amplitude $A_2$ of the coil drive current $a_2$. This arrangement permits multiple recording and increases the recording capacity of the magneto-optical disk.

15 Claims, 7 Drawing Sheets

METHOD AND APPARATUS FOR MAGNETO-OPTICAL RECORDING OR REPRODUCING USING MODULATED MAGNETIC FIELD

FIELD OF THE INVENTION

The present invention relates to a magneto-optical recording method, a magneto-optical signal reproducing method and a magneto-optical recording and reproducing apparatus for recording or reproducing information on a magneto-optical recording medium by modulating a magnetic field.

BACKGROUND OF THE INVENTION

Development of storage media capable of recording, reproducing and erasing information thereon has been carried out. A high-capacity high-density magneto-optical disk is a typical example of such a storage medium.

The magneto-optical disk is replaceable. Although fixed disks have closed structure in a prior art, a fixed disk employing a replaceable disk cartridge appears. In order to compete against such a fixed disk, the main object of the development of magneto-optical disks is to achieve a high-speed transfer device and high-speed access. As one means for achieving the object, development of a so-called over-writing technique for recording new information over previously recorded information without erasing the previously recorded information has been actively carried out.

One of the overwriting technique is a magnetic-field modulation recording method. In this method, recording and erasing of information on the magneto-optical disk are performed by reversing the direction of an external magnetic field with a magnetic head according to information to be recorded while irradiating laser light with a uniform intensity.

The magnetic-field modulation recording method achieves not only the high-speed recording performance, but also records short bits easily and performs high-density recording such as bit edge recording because the recording density greatly depends on the recording frequency of the magnetic head. FIG. 7 shows one example of the state of recording bits 51 recorded by magnetic-field modulation.

However, even when the magnetic-field modulation recording method is used, the recording density in optical recording greatly depends on the diameter of a laser beam focused by an optical pickup in a reproducing process. Therefore, in order to achieve high-density recording, efforts have been made to mainly improve the recording medium and the optical pickup. In recent years, a magnetic super resolution technique has been developed to achieve a shortening of a reproducible bit length on the recording medium.

However, since whether or not high-density recording is achieved on the magneto-optical recording medium is finally decided by the laser spot diameter which is determined by the laser wavelength used in the optical system, the technique for improving the recording density by shortening the recordable and reproducible bit length has its limitation.

Moreover, a wobbling technique has been used as an address generating method for recordable magneto-optical disks, such as write once read many type CD (CD-R) and mini disks (MD). The wobbling technique is a method for recording addresses on the disk or clock signals for controlling the rotation of the disk by wobbling the guide grooves on the disk.

As shown in FIG. 8, the physical addresses are given by forming pre-pits 55 on grooves 53 on the tracks of the magneto-optical disk in advance. Namely, recording data 52 is recorded on the groove 53 having the pre-pit 55. It is also possible to form a pre-pit on a land 54 located between the grooves 53 and record data on the land 54.

However, in order to arrange a specific format including the pre-pits on the magneto-optical disk, a cutting technique using a plurality of lasers is required. Namely, an extremely high technique is needed for producing the disk. In addition, since this format is formed by the pre-pits, a change cannot be made on the format, preventing the use of formats achieved by an improved technique for high-capacity recording and high-speed access.

SUMMARY OF THE INVENTION

An object of the present invention is to provide a magneto-optical recording method and a magneto-optical recording and reproducing apparatus, for recording a plurality of signals on the same track of a magneto-optical recording medium by changing the recording magnetic field strength or the laser power for every signal to be recorded.

Another object of the present invention is to provide a magneto-optical signal reproducing method for easily reproducing signals recorded by a magneto-optical recording method like the above.

In order to achieve the above object, a first magneto-optical recording method of the present invention is a magneto-optical recording method for recording information on a magneto-optical recording medium, and includes the steps of:

generating a plurality of signals to be recorded, the signals having different frequency bands which do not overlap each other;

deciding a recording order for recording the plurality of signals;

varying a recording magnetic field strength of each of the signals so that the recording magnetic field strength decreases in the recording order; and recording a first data signals among the signals on a track of the magneto-optical recording medium by modulating the magnetic field according to the first data signal and recording a second data signal among the signals on the same track with a different magnetic field strength using a recording method with magnetic-field modulation.

In this structure, since the recording magnetic field whose strength varies depending on each of the plurality of signals to be recorded is applied, recording bits whose width varies according to each signal are formed. In addition, since the recording magnetic field strength decreases in the recording order of the signals, the recording bit width is also decreased in the recording order of the signals.

Therefore, when a signal is recorded on a track of the magneto-optical medium and another signal is then recorded on the same track, the formerly recorded signal can remain. Namely, it is possible to perform multiple recording capable of recording a plurality of signals on a single track. As a result, the recording density on the magneto-optical recording medium is significantly improved. In this case, since the plurality of signals have different frequency bands (including a single frequency) which do not overlap each other, it is possible to individually reproduce each of the plurality of signals recorded.

A second magneto-optical recording method for recording information on a magneto-optical recording medium, includes the steps of:

generating a plurality of signals to be recorded, the signals having different frequency bands which do not overlap each other;

deciding a recording order for recording the plurality of signals;

varying the intensity of laser light so that the intensity of the laser light decreases in the recording order; and recording a first data signal among the signals on a track of the magneto-optical recording medium by modulating the magnetic field according to the first data signal and recording the second data signal among the signals on the same track with a different laser light intensity using the recording method with magnetic-field modulation while irradiating the laser light so that the width of a bit recorded on the same track becomes smaller in the recording order.

In this structure, since the laser light whose intensity varies depending on each of the plurality of signals to be recorded is irradiated, recording bits whose width varies according to each signal are formed. In addition, since the intensity of the laser light is decreased in the recording order of the signals, the recording bit width is also decreased in the recording order of the signals Therefore, like the first structure, when a signal is recorded on a track of the magneto-optical medium and another signal is then recorded on the same track, the formerly recorded signal can remain. Namely, it is possible to perform multiple recording capable of recording a plurality of signals on a single track. As a result, the recording density on the magneto-optical recording medium is significantly improved.

A third magneto-optical recording method is based on the first or second magneto-optical recording method, and characterized by recording first a signal representing physical format information of the magneto-optical recording medium among the signals and recording a data signal second or later in the step of deciding the recording order.

In this structure, among the plurality of signals in the first and second magneto-optical recording methods, the signal representing the physical format information of the magneto-optical recording medium, for example, a linear velocity of a light beam, addresses indicating recording and reproducing positions, or time, can be used as the signal to be recorded first. It is therefore not necessary to form a specific pattern on the magneto-optical recording medium in advance with a cutting device. Consequently, the time and cost required for producing the magneto-optical recording medium can be reduced. Moreover, since the physical format can be changed after producing the magneto-optical recording medium, it is possible to achieve a high-capacity and high-speed access format if it is desired by the user. Moreover, if an improved format is developed in future, this structure is applicable.

A first magneto-optical signal reproducing method for reproducing information from a magneto-optical recording medium, includes the steps of:

reproducing a plurality of signals, recorded on a track of the magneto-optical recording medium with different frequency bands which do not overlap each other, in a state in which the reproduced signals are mixed; and separating the reproduced signals according to frequency band.

In this structure, since the plurality of signals with different frequency bands which do not overlap each other are recorded on the same track, the reproduced signals are in a state in which a plurality of components are mixed. Subsequently, by separating the reproduced signals according to frequency band, the plurality of recorded signals can be individually reproduced.

A first magneto-optical recording and reproducing apparatus for recording information on a magneto-optical recording medium, includes:

a magnetic head for generating a recording magnetic field;

a magnetic head driving circuit, connected to the magnetic head, for changing the strength of the recording magnetic field by a drive current;

an optical pickup, disposed in a position facing the magnetic head through the magneto-optical recording medium, for irradiating laser light on the magneto-optical recording medium and detecting reflected light from the magneto-optical recording medium as a reproduced signal; and separating means, connected to the optical pickup, for separating the reproduced signals according to frequency band.

In this structure, the laser light is irradiated on the magneto-optical recording medium by the optical pickup, and only the temperature in an area irradiated with the laser light increases. Since a recording magnetic field is generated by the magnetic head, the magnetization direction in the area changes, thereby recording information. In this case, if the strength of the recording magnetic field is changed by a drive current, the width of a recording bit to be recorded on the magneto-optical recording medium varies.

It is thus possible to easily perform multiple recording by the first to third magneto-optical recording methods. Furthermore, by simply connecting a plurality of separating means to the optical pickup, the reproduced signals are separated according to frequency band. Consequently, reproduction of multiple recording can be achieved with a simple structure.

For a fuller understanding of the nature and advantages of the invention, reference should be made to the ensuing detailed description taken in conjunction with the accompanying drawings.

DETAILED DESCRIPTION OF THE PREFERRED EMBODIMENTS

[Embodiment 1]

The following description will discuss one embodiment of the present invention with reference to FIGS. 1 to 5.

Figure 1:
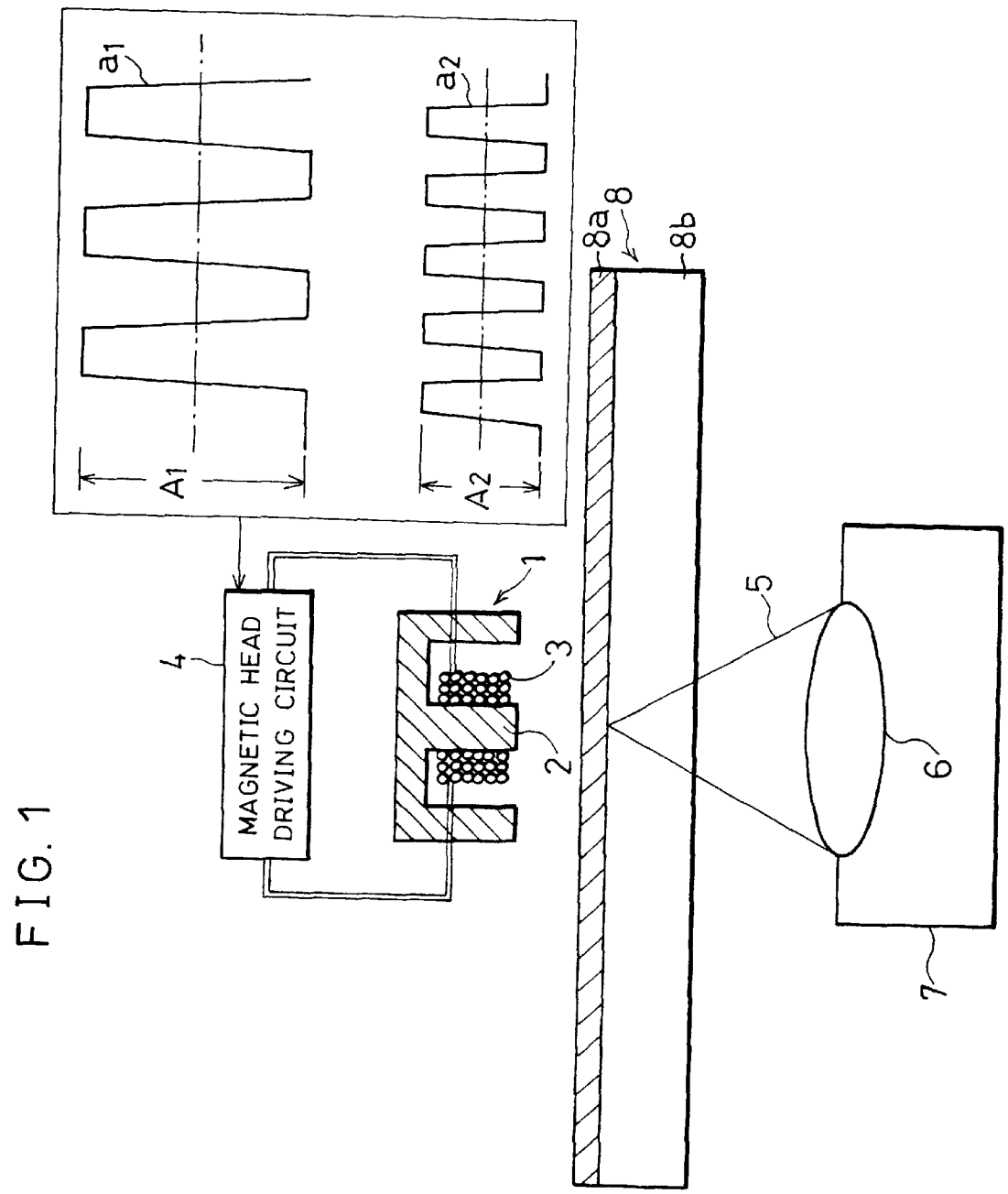
FIG. 1 is an explanatory view showing the structure of a magneto-optical recording and reproducing apparatus according to one embodiment of the present invention.

As illustrated in FIG. 1, a magneto-optical recording and reproducing device according to Embodiment 1 includes a magnetic head 1 and an optical pickup housing 7.

The magnetic head 1 has an E-shaped profile, and includes a magnetic core 2 around which a coil 3 is wound. A magnetic head driving circuit 4 is connected to the magnetic coil 3. The magnetic head driving circuit 4 drives the magnetic head 1 by causing a coil drive current to flow through the coil 3.

The optical pickup housing 7 has therein a semiconductor laser and an optical system. Laser light 5 emitted by the semiconductor laser is focused on an objective lens 6 through the optical system, and projected onto a magneto-optical disk 8 (a magneto-optical recording medium). The positional relation between the objective lens 6 and the magnetic core 2 of the magnetic head 1 is that the center of the magnetic core 2 coincides with a position on the magneto-optical disk 8 onto which the laser light 5 is focused.

The magneto-optical disk 8 is constructed by arranging a recording layer 8a on a transparent substrate 8b. The magneto-optical disk 8 is designed for magnetic-field modulation recording, and achieves sufficient signal quality with a recording magnetic field of not lower than 8 kA/m.

The recording layer 8a has a track pitch of 1.4 $\mu$m and a groove width of 0.8 $\mu$m. The size of the magnetic core 2 is 0.3 mm×0.2 mm. The number of turns of the coil 3 is 24 turns. When the coil drive current is 0.2 A, the magnetic head 1 generates a magnetic field of 12 kA/m in a direction perpendicular to the surface of the magneto-optical disk 8. As the semiconductor laser in the optical pickup housing 7, a red laser with a wavelength of 680 nm is used.

In this configuration, the laser light 5 focused by the objective lens 6 is projected onto a groove (track) on the recording layer 8a of the magneto-optical disk 8. The temperature of the recording layer 8a increases only in an area irradiated with the laser light 5.

Meanwhile, data signals to be recorded are input to the magnetic head driving circuit 4. In this case, the data signals include a first data signal to be recorded first, and a second data signal to be recorded next. As illustrated in FIG. 1, a coil drive current $a_1$ for recording the first data signal is set higher than a coil drive current $a_2$ for recording the second data signal. Namely, the recording magnetic field strength of the second data signal is smaller than that of the first data signal. For instance, the coil drive current $a_1$ has a single frequency of 300 kHz, and an amplitude $A_1$ of ±0.25 A. The coil drive current $a_2$ has a single frequency of 3 MHz, and an amplitude $A_2$ of ±0.15 A.

In recording, recording of the first data signal having a higher recording magnetic field strength is first performed. More specifically, when a recording magnetic field corresponding to the first data signal is generated by the magnetic head 1, the direction of magnetization in an area of the magneto-optical disk 8 having an temperature increase changes, thereby recording the first data signal. Subsequently, in the same manner as above, the second signal is recorded over the first data recorded with a lower recording magnetic field strength.

When performing magnetic-field modulation recording, the width of a recording bit to be recorded varies depending on the recording magnetic field. Namely, if the recording magnetic field strength according to the first data signal is set higher than that of the second data signal as mentioned above, the width of the recording bit of the first data signal becomes larger than that of the second data signal. Consequently, ever after recording the second data signal, the first data signal remains without being erased by the second data signal. It is predicted from data of reproduced signals to be described later that the recording state of data on the groove will be the one shown in FIG. 4. Namely, recording bits 11 of the first data signals are considered to remain on both sides of recording bits 12 of the second data signals.

Figure 2:
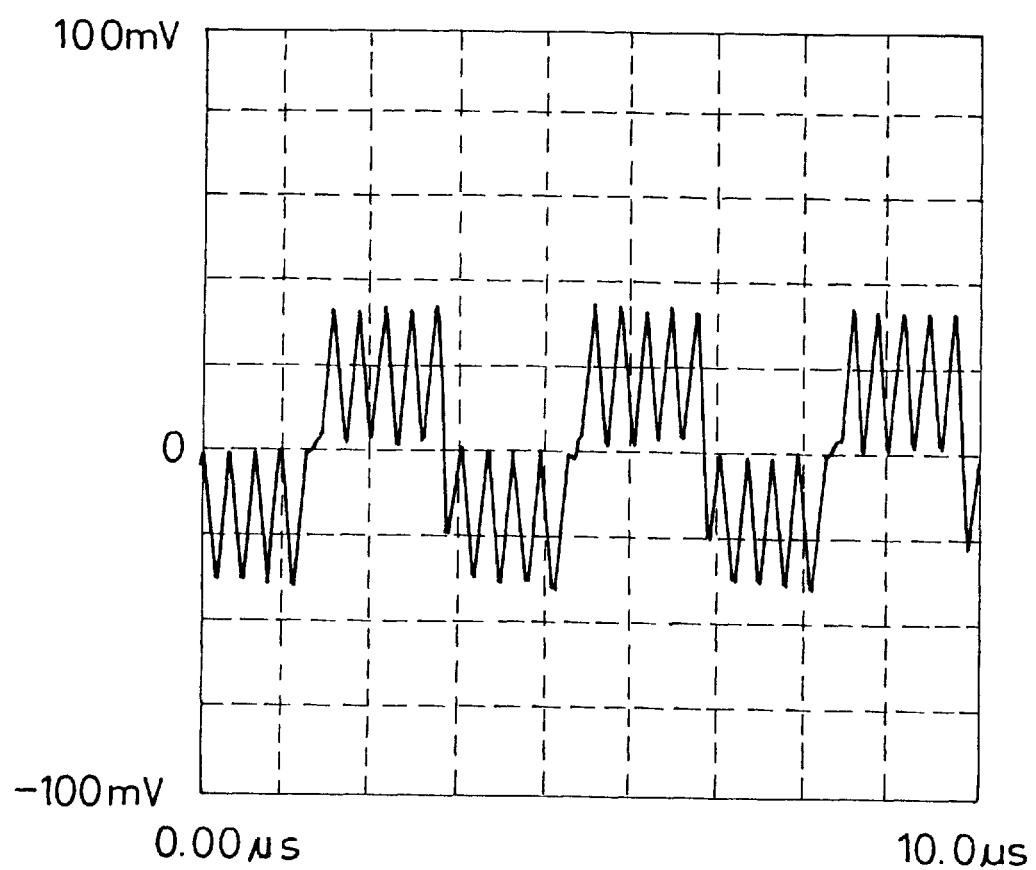
FIG. 2 is a graph showing the waveform of a reproduced signal obtained when two data signals recorded on the same track are reproduced.

FIG. 2 shows the waveform of a reproduced signal obtained from a data section in which the first and second data signals are recorded. In FIG. 2, the horizontal axis indicates time, and the vertical axis is an output voltage (20 mV/div). It is found from FIG. 2 that the first and second data signals can be reproduced simultaneously because the reproduced signal in which two kinds of components are mixed is detected.

Figure 3:
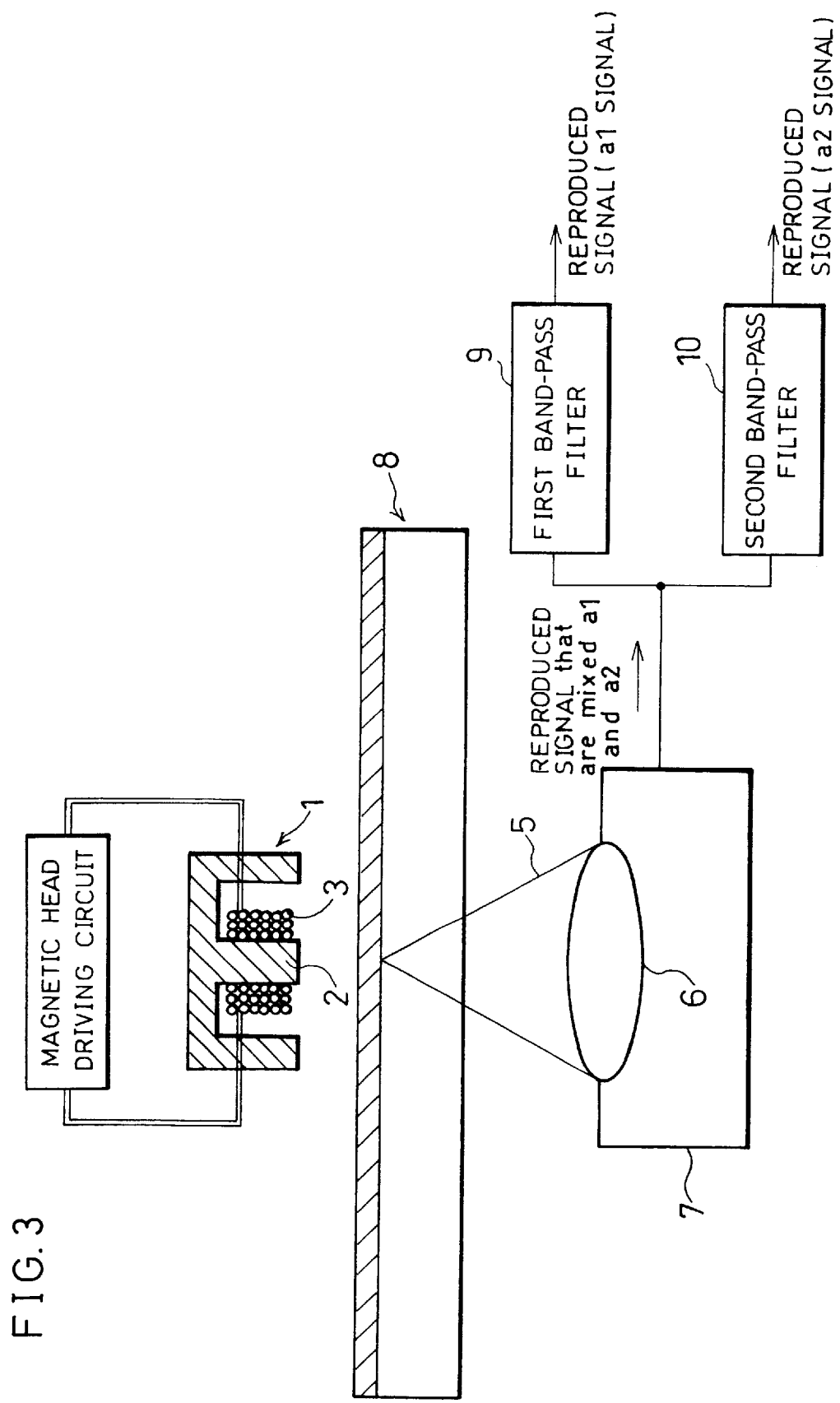
FIG. 3 is an explanatory view showing the structure of the magneto-optical recording and reproducing apparatus including reproducing means.
Figure 4:
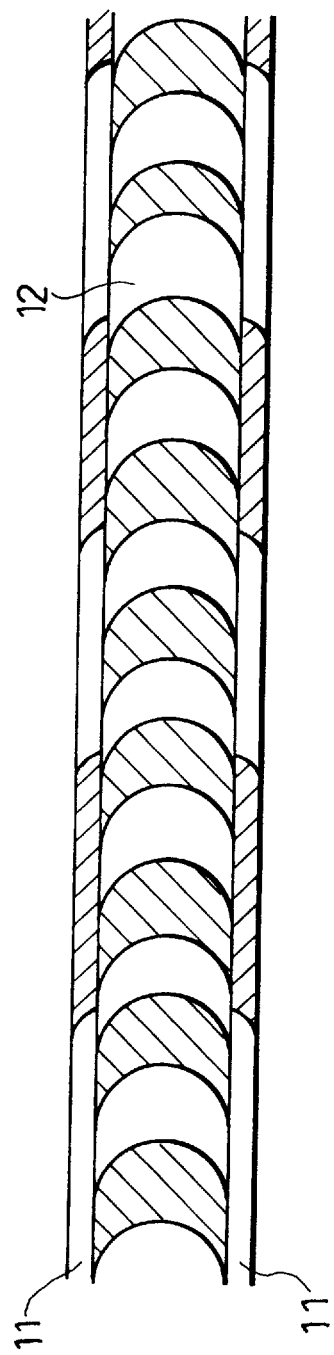
FIG. 4 is an explanatory view showing a recording bit string of two types of data signals recorded on a magneto-optical disk.

In order to separate the reproduced signal in which two kinds of components are mixed into two different reproduced signals, a magneto-optical recording and reproducing apparatus is constructed as shown in FIG. 3. A first band-pass filter 9 and a second band-pass filter 10 are connected in parallel to the optical pickup housing 7. The first and second band-pass filters 9 and 10 (separating means) are filters corresponding to the recording frequency bands of the first and second data signals, respectively. Thus, the first band-pass filter 9 outputs a first reproduced signal obtained by reproducing the first data signal, while the second band-pass filter 10 outputs a second reproduced signal obtained by reproducing the second data signal.

As described above, according to this magneto-optical recording method, by changing the recording magnetic field strength generated by the magnetic head 1 with respect to every data signal, it is possible to achieve multiple recording which permits different data signals to be recorded on one track. Consequently, the recording capacity of the magneto-optical disk 8 is significantly improved.

Moreover, it is possible to separate reproduced signals according to frequency by simply providing two band-pass filters in the magneto-optical recording and reproducing apparatus. As a result, the data signals recorded by multiple recording can be individually reproduced with a simplified structure.

Here, the first and second data signals are respectively recorded as a single frequency. However, these signals may have constant frequency bands, respectively. In this case, the recording frequency bands of the first and second data signals are arranged not to overlap each other.

It is desirable that the recording frequency of the second data signal is higher than that of the first data signal due to the following reason. As the recording bit length becomes shorter, the signal quality of the reproduced signal deteriorates and the intensity distribution of the laser light focused in a usual manner becomes Gaussian. Therefore, a signal (second data signal) with a short recording bit length in which the reproduction C/N is low achieves a more favorable C/N during reproduction if this signal is recorded in the center of the track where the light intensity is high.

Next, the following description will discuss an operation in which the signal recorded first is a time signal that is a signal indicating physical format information of the magneto-optical disk 8 or an address signal and the signal recorded next is a data signal, performed by the above-mentioned magneto-optical recording and reproducing apparatus. In this case, the time signal is a signal used for controlling the rotation of the disk.

Figure 5:
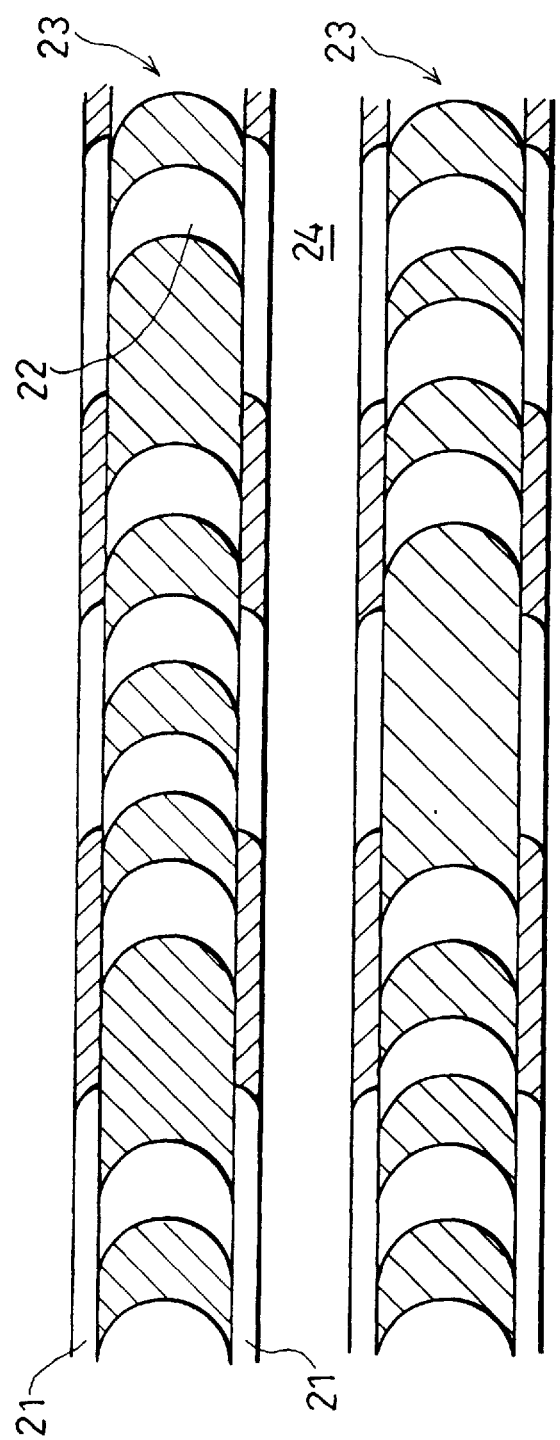
FIG. 5 is an explanatory view showing addresses and recording bits recorded on the magneto-optical disk.

First, similarly to the generation of the first data signal, address signals are generated on the groove by the magnetic-field modulation recording using the magnetic head 1. Subsequently, recording data is produced by making the recording magnetic field strength smaller than the case in which the address signal is generated and writing the data signals on the same groove as above. As a result, for example, as shown in FIG. 5, addresses 21 remain on both side of recording data 22 on grooves 23 which are formed on both sides of a land 24.

At this time, like the recording of the first and the second data signals, the address signal is written by arranging the amplitude of the drive current to be ±0.25 A, and the data signal is written by arranging the amplitude of the drive current to be ±0.15 A. In the above-mentioned recording of the first and second data signals, recording is performed at a single frequency. However, the address signal is recorded by FM modulation in which the frequency has a specific value between 30 and 60 kHz and the amplitude of the drive current is constant.

As described above, in this magneto-optical recording method, by forming the address signal on the groove according to magnetic-field modulation recording, unlike a conventional method, there is no need to form a pre-pit corresponding to an address signal and a synchronous signal for each sector when fabricating the magneto-optical disk. As a result, the time taken for fabricating the magneto-optical disk is significantly reduced. In addition, it is also not necessary to provide a high-precision cutting device for the formation of the pre-pits. Consequently, the formation of the pre-pits on a disk stamper is not required, thereby achieving a reduction in the cost of producing the stamper. It is therefore possible to decrease the cost of the magneto-optical disk 8 to a great degree. In particular, in a magneto-optical recording and reproducing apparatus employing a CAV (constant angular velocity) recording and reproduction in which the rotation speed is uniform, the address signal can be formed more easily than a conventional method.

The formation of addresses by the above-mentioned magneto-optical recording method is also applicable to a ZCAV (zone constant angular velocity) method which increases the recording density by changing the recording frequency in each recording area and making the shortest bit length uniform. In this case, it is only necessary to change the frequency of the address signal in each area.

The formation of addresses by the above-mentioned magneto-optical recording method is also applicable to a CLV (constant linear velocity) disk. In this case, it is desirable to add the address signals during the formation of the disk. The reason for this is that when formatting the disk by this magneto-optical recording method after the formation of the disk, it is necessary to provide the magneto-optical recording and reproducing apparatus with a device which can accurately measure a signal reading position, for example, a motor for accurately controlling the rotation speed and a rotation speed controlling device. The addition of the motor and the pickup position measuring device is not advantageous in terms of costs. However, such devices permit a change in the disk format of the magneto-optical disk as to be described later.

More specifically, with the use of the magneto-optical disk having addresses formed by the magneto-optical recording method of the present invention, it is possible to select a format from the CLV type in which an increase in the capacity takes precedence and the CAV type in which an increase in the access speed takes precedence. Moreover, if a format that achieves higher speed and higher density is developed in future, it is applicable to the above-mentioned magneto-optical disk.

[Embodiment 2]

Figure 6:
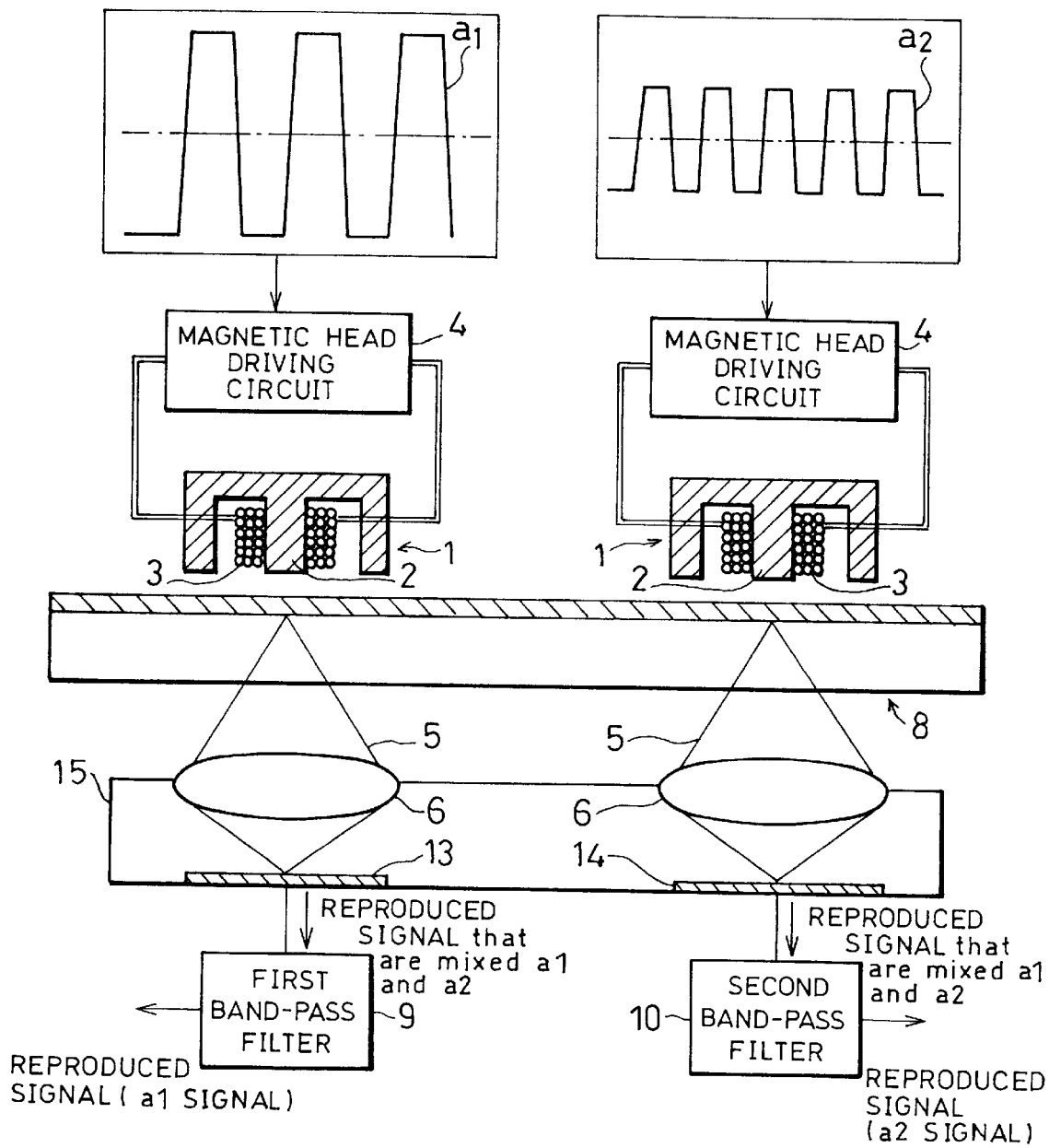
FIG. 6 is an explanatory view showing the structure of a magneto-optical recording and reproducing apparatus according to another embodiment of the present invention.
Figure 7:
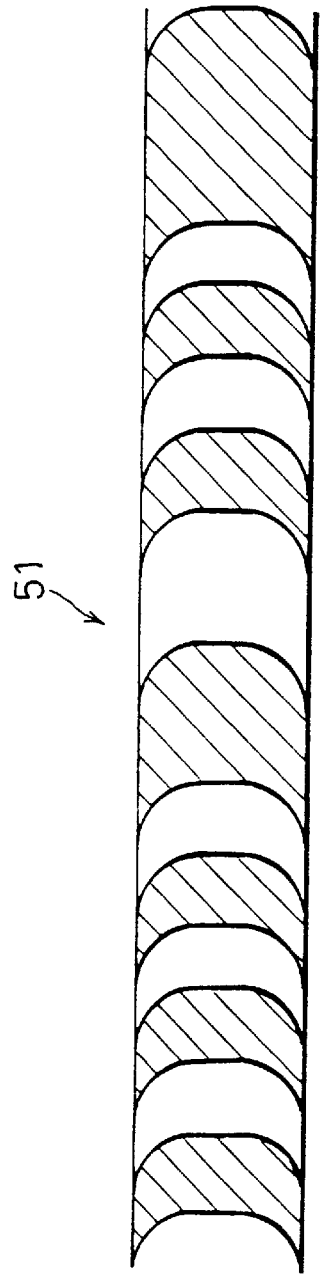
FIG. 7 is an explanatory view showing a conventional recording bit.
Figure 8:
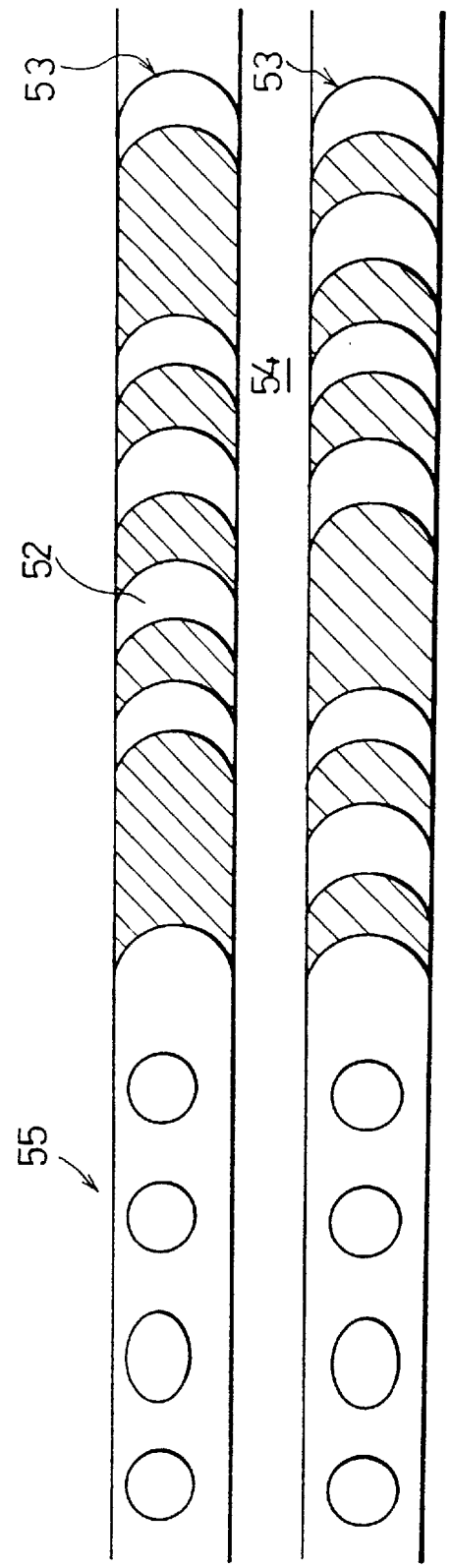
FIG. 8 is an explanatory view showing addresses formed by conventional pre-pits.

The following description will discuss another embodiment of the present invention with reference to FIG. 6. The same members as those in Embodiment 1 will be designated by the same code and their description will be omitted.

As illustrated in FIG. 6, a magneto-optical recording and reproducing apparatus of Embodiment 2 is constructed as a two-beam recording and reproduction system in which two magnetic heads 1 and two corresponding objective lenses 6 are used. Namely, two structures, each of them being composed of the magnetic head 1 and the optical pickup of Embodiment 1, are provided for one magneto-optical disk 8.

The magnetic head driving circuits 4 are connected to the magnetic heads 1. An optical pickup housing 15 has therein the objective lenses 6, and recording signal detecting sections 13 and 14. The laser light 5 focused by each objective lens 6 is projected onto the magneto-optical disk 8, and reflected. The reflected light again passes through the objective lens 6, and is then incident on the recording signal detecting section 13 or 14. The first band-pass filter 9 is connected to the recording signal detecting section 13. The second band-pass filter 10 is connected to the recording signal detecting section 14.

In this structure, the first and second data signals to be recorded are input to the magnetic head driving circuits 4, respectively. In this case, as shown in FIG. 6, the coil drive current $a_1$ for recording the first data signal is set higher than the coil drive current $a_2$ for recording the second data signal. Namely, the recording magnetic field strength of the second data signal is smaller than that of the first data signal.

In recording, recording of the first data signal having a higher recording magnetic field strength is first performed by one of the magnetic heads 1. Next, the second data signal is recorded over the recorded first data by the other magnetic head 1. It is thus possible to record the first data signal and the second data signal independently of each other by the respective magnetic heads 1.

In the magneto-optical recording and reproducing apparatus having the recording and reproduction system using one beam of Embodiment 1, it is necessary to vary the strength of the recording magnetic field generated by the magnetic head 1 according to data to be recorded. Whereas in the magneto-optical recording and reproducing apparatus having the recording and reproduction system using two beams of Embodiment 2, it is possible to arrange the strength of the recording magnetic fields generated by the respective magnetic heads 1 to be constant.

Moreover, immediately after recording the first data signal on a track, it is possible to record the second data signal on the same track over the first data signal. This arrangement is particularly effective when recording data signals with two recording frequency bands. For example, when recording two types of signals, i.e., video and audio signals, with two different magnetic heads to record a moving image, the two signals are used in different recording frequency bands. In this case, the timing of recording can be changed with the use of a data buffer. Namely, the two data are recorded on the same track by delaying the recording of data to be recorded second. Similarly, the reproduction of such data can also be performed by adjusting the timing of reproduction by storing data using the data buffer.

The reproduction of the first and second data signals is performed as follows. The reflected light from the magneto-optical disk 8 is incident on the recording signal detecting sections 13 and 14, respectively, and a reproduced signal is detected at each section. These reproduced signals are mixed signals of two components, i.e., the first and second data signals. The reproduced signal from the recording signal detecting section 13 outputs through the first band-pass filter the first reproduced signal as a reproduction of the first data signal. The reproduced signal from the recording signal detecting section 14 outputs through the second band-pass filter 10 the second reproduced signal as a reproduction of the second data signal. It is thus possible to easily reproduce multiple recording like Embodiment 1.

It is also possible to record address signals and data signals using this magneto-optical recording and reproducing apparatus. More specifically, one of the two optical pickups can be used for recording the address signals, and the other can be used for recording data signals. In this case, like Embodiment 1, since the address signals can be easily produced, it is possible to reduce the cost and time required for cutting the disk. Moreover, since the recording of the data signals can be performed while producing the address signals, it is possible to significantly reduce the time taken for formatting the disk compared to a conventional arrangement.

In Embodiments 1 and 2, the recording bit width is changed by varying the recording magnetic field strength. However, the recording bit width may be changed by varying the laser power, or varying the both recording magnetic field strength and laser power. More specifically, a plurality of signals to be recorded, having different frequency bands which do not overlap each other, may be recorded on the same track on the magneto-optical disk by applying recording magnetic fields of the same strength and applying different laser powers. In this case, the laser power is made smaller in the recording order for recording the signals.

The reasons for this is as follows. When laser light is focused, the intensity of the laser light shows the Gaussian distribution. In magnetic-field modulation recording, since the linear velocity is constant and the laser power is uniform in the case of CLV, the temperature distribution in a radial direction of the magneto-optical disk is always uniform. Therefore, if the laser power is uniform and the recording magnetic field strength is also uniform, the same recording bit width is always obtained. Thus, by varying the laser power, the recording bit width can be changed as in the case where the recording magnetic field strength is changed.

In the case of CAV, the linear velocity varies depending on a recording radius position. In this case, however, it is possible to make the recording bit width uniform irrespectively of a recording radius position by appropriately controlling the recording magnetic field strength or the recording laser power, or controlling both of them, according to the recording radius position.

Additionally, in Embodiments 1 and 2, the signal to be recorded on the same track are two signals, i.e., the first and second data signals or address and data signals. However, the signals to be recorded are not necessarily limited to those mentioned above. Namely, by varying the recording magnetic field strength to perform recording in the order of greatness of the magnetic field strength, it is possible to record a plurality of signals. Alternatively, by varying the laser power to perform recording in the order of greatness of the laser power, it is possible to record a plurality of signals.

Moreover, in Embodiments 1 and 2, recording is made on the grooves. However, recording may be made on the lands. It is also possible to perform multiple recording on the lands, and to obtain the same effects as above. Furthermore, it is possible to perform recording both on the groove and the land. In this case, a higher recording density can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording method for recording information on a magneto-optical recording medium, comprising the steps of:

generating a plurality of signals to be recorded, said signals having different frequency bands which do not overlap each other;

deciding a recording order for recording said plurality of signals;

recording a first data signal among said plurality of signals on a track of said magneto-optical recording medium to have a recording bit width W1 in the recording order by modulating a recording magnetic field according to said first data signal and applying said recording magnetic field to said magneto-optical recording medium; and recording a second data signal different from said first data signal among said plurality of signals in a portion of said track of said magneto-optical recording medium wherein said first data signal is recorded to have a recording bit width W2 which is narrower than said recording bit width W1 in the recording order by modulating said recording magnetic field according to said second data signal and applying said recording magnetic field to said magneto-optical recording medium.

2. A magneto-optical recording method for recording information on a magneto-optical recording medium, comprising the steps of:

generating a plurality of signals to be recorded, said signals having different frequency bands which do not overlap each other;

deciding a recording order for recording said plurality of signals;

varying a recording magnetic field strength of each of said signals so that the recording magnetic field strength decreases in the recording order; and recording a first data signal among said signals on a track of said magneto-optical recording medium by modulating said magnetic field according to said first data signal and recording a second data signal among said signals on said track with a different magnetic field strength using a recording method with magnetic-field modulation.

3. The magneto-optical recording method as set forth in claim 2, wherein the recording order is decided so that signals are recorded in order of recording frequency from the lowest recording frequency, and an amplitude of a coil current is controlled so that the earlier the recording order for recording the signals, the greater the recording magnetic field strength in magnetic-field modulation recording.

4. The magneto-optical recording method as set forth in claim 2, wherein the recording order is decided so that, among the signals, a signal representing physical format information of said magnet-optical recording medium is recorded first and a data signal is recorded after the signal representing the physical format information.

5. The magneto-optical recording method as set forth in claim 4,
wherein said format information relates to information selected from the group consisting of (i) a linear velocity of the light beam, (ii) addresses indicating recording and reproducing positions, and (iii) time.

6. A magneto-optical recording method for recording information on a magneto-optical recording medium, comprising the steps of:
generating a plurality of signals to be recorded, said signals having different frequency bands which do not overlap each other;
deciding a recording order for recording said plurality of signals;
varying an intensity of laser light so that the intensity of said laser light decreases in the recording order; and
recording a first data signal among said signals on a track of said magneto-optical recording medium and recording a second data signal among said signals on said track with a different laser light intensity using a recording method with magnetic-field modulation while irradiating the laser light so that a width of a bit recorded on the same track becomes smaller in the recording order.

7. A magneto-optical reproducing method for reproducing information from a magneto-optical recording medium, comprising the steps of:
reproducing a plurality of signals containing of different kinks of information, recorded on a same section of a track of said magneto-optical recording medium with each kind of information having a different frequency band which does not overlap each other, in a state in which said reproduced signals are mixed; and
separating the reproduced signals according to frequency band.

8. The magneto-optical reproducing method as set forth in claim 7,
wherein, in the step of separating the reproduced signals, said reproduced signals are separated into a signal indicating physical format information of said magneto-optical recording medium and a data signal.

9. A magneto-optical recording and reproducing apparatus for recording information on a magneto-optical recording medium, said apparatus comprising:
a magnetic head for generating a recording magnetic field;
a magnetic head driving circuit, connected to said magnetic head, for changing a strength of said recording magnetic field by a drive current;
an optical pickup, disposed in a position facing said magnetic head through said magneto-optical recording medium, for irradiating laser light on said magneto-optical recording medium and detecting reflected light from said magneto-optical recording medium as a reproduced signal, wherein the reproduced signal from a particular section of track of the magneto-optical recording medium contains mixed data signals comprising (i) a first data signal having a first frequency band and (ii) a second data signal having a second frequency band; and
separating means, connected to said optical pickup, for separating said reproduced signals according to frequency band.

10. The magneto-optical recording and reproducing apparatus as set forth in claim 9,
wherein said separating means is a band-pass filter provided for each frequency band.

11. The magneto-optical recording and reproducing apparatus as set forth in claim 9,
wherein said magnetic head driving circuit is supplied with a first data signal to be recorded first, and a second data signal to be recorded after said first data signal, and varies the strength of said recording magnetic field by changing an amplitude of said drive current according to input of both of said signals, said first and second data signals having characteristics selected from frequencies, and frequency bands.

12. The magneto-optical recording and reproducing apparatus as set forth in claim 11,
wherein said magnetic head driving circuit sets an amplitude of a drive current corresponding to the first data signal to be greater than an amplitude of a drive current corresponding to the second data signal.

13. The magneto-optical recording and reproducing apparatus as set forth in claim 12,
wherein said magnetic head driving circuit sets a frequency band of the drive current corresponding to the first data signal to be lower than a frequency band of a drive current corresponding to the second data signal.

14. The magneto-optical recording and reproducing apparatus as set forth in claim 11,
wherein said first data signal is a signal representing physical format information of a magneto-optical recording medium, and said second data signal is a signal representing data,
wherein said format information relates to information selected from the group consisting of (i) a linear velocity of a light beam, (ii) addresses indicating recording and reproducing positions, and (iii) time.

15. The magneto-optical recording and reproducing apparatus as set forth in claim 11,
wherein said magnetic head driving circuit includes:
a first magnetic head driving circuit for generating a drive current according to the first data signal; and
a second magnetic head driving circuit for generating a drive current according to the second data signal,
said magnetic head includes:
a first magnetic head to be driven by said first magnetic head driving circuit; and
a second magnetic head, driven by said second magnetic head driving circuit, for applying a magnetic field to a track to which said first magnetic head applies a magnetic field,
said optical pickup includes:
a first optical pickup disposed in a position facing said first magnetic head through said magneto-optical recording medium; and
a second optical pickup disposed in a position facing said second magnetic head through said magneto-optical recording medium,
said separating means includes:
a first band-pass filter, connected to said first optical pickup, for outputting only a signal with a frequency band of said first data signal; and
a second band-pass filter, connected to said second optical pickup, for outputting only a signal with a frequency band of said second data signal, and
a property selected from the group consisting of (i) a recording magnetic field strength, (ii) a recording laser light intensity, and (iii) a recording magnetic field strength and the recording laser light intensity is controlled so that a bit width W3 written by said first magnetic head and said first magnetic head and said first optical pickup and a bit width W4 written by said second magnetic head and said second optical pickup differ from each other.

* * * * *